June 6, 1961     A. R. BALCHUNS     2,986,822
READING TRAINING DEVICE
Filed April 18, 1960
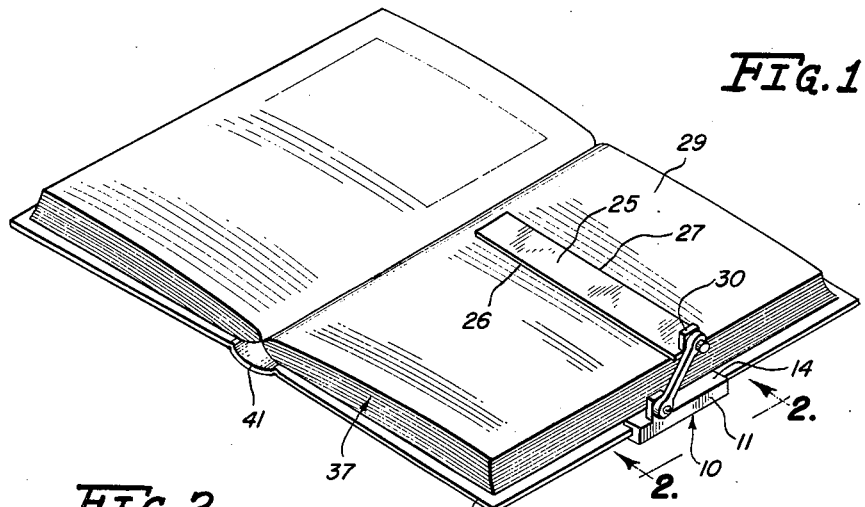
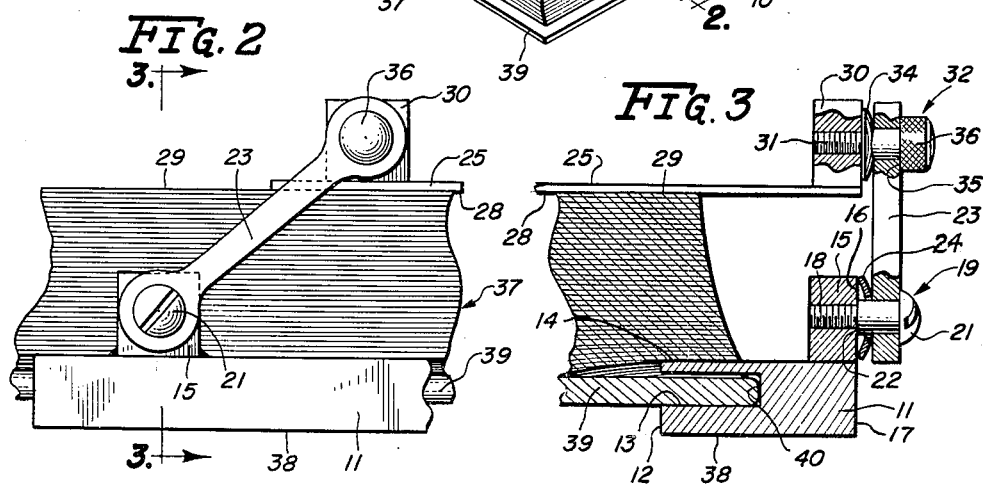
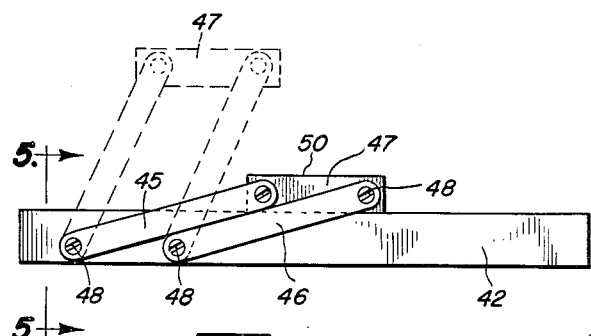
INVENTOR.
Anthony R. Balchuns
BY Frederick J. Kaubel
Atty.

United States Patent Office 2,986,822
Patented June 6, 1961

2,986,822
READING TRAINING DEVICE
Anthony R. Balchunas, 4718 S. La Crosse Ave.,
Chicago 38, Ill.
Filed Apr. 18, 1960, Ser. No. 22,984
8 Claims. (Cl. 35—35)

This invention relates to a reading training device and more particularly to a new and improved manually operated device for use in developing speed in perception and retention of the content of reading material.

Through numerous tests and observations educators in the field of reading training have definitely established that the degree of comprehension of the content of written material by a reader is related to the rate of perception and one of the causes of inefficient reading is due to the fact that a poor reader tends to reread fragments of previously read sentences of printed material a number of times before comprehension of the material is obtained. To overcome this difficulty and to increase reading speed and comprehension, various types of machines and devices have been employed in the teaching of reading which are all generally capable of moving a shutter or mask over the page of reading material at a preset rate of speed by power means such as an electric motor or the like, so that the student is forced to read at a rate equal to or greater than the rate of the shutter movement and cannot reread the sentences, words, etc. previously read because of the masking effect of the shutter. As the reading efficiency of the student is increased and the student is able to comprehend and understand the printed material upon a single perusal thereof at a preset shutter speed, the speed rate at which the shutter traverses over the printed matter is gradually increased. Such a power actuated remedial training device is disclosed in applicant's co-pending application entitled Reading Training Device, Serial No. 6144, filed on February 2, 1960.

Educators have found that there is some abhorrence on the part of the student when first subjected to a power actuated machine wherein the shutter speed is automatically controlled and as a result the remedial reading instructor's work oftentimes becomes difficult, and in the case of very reluctant students, his efforts are for naught since they fail to produce any noticeable increase in the reading rate and perception of the students. It is therefore, the primary objective of the present invention to overcome this difficulty by providing a self-operated device for assisting conditioning of the student to accept training on a power actuated machine.

A further object is the provision of a manually-operated remedial training device which is relatively simple in construction and inexpensive to manufacture but which is durable and sturdy and capable of operating efficiently over long periods of time without repair and with a minimum of maintenance.

A still further object of the invention is the provision of a reading training device comprising a shutter or mask which is manually movable over a page of written material by the student himself and wherein successive lines of the printed or written page are continually masked off in order to prevent rereading the previously read portions of the page. In this manner the student becomes acquainted with the operation of power operated reading training devices and while the student cannot accurately control the rate at which the shutter traverses the printed matter nor can be maintain the shutter speed constant he does learn to read printed matter as a shutter or mask travels over the page.

Another object of the invention is the provision of a light-weight, compact remedial reading training device which is easily transportable and thus the student is afforded the opportunity to practice remedial reading at home or in study halls or the like.

Still another object is to provide a remedial reading training device capable of being used in conjunction with printed matter of various kinds, sizes and thicknesses and wherein the shutter or mask is adjustable whereby a flat surface thereof is caused to move parallel to and lightly engage the page of the reading material being read.

A still further object is to provide a manually operated reading training device having means operatively engageable with a longitudinal edge of the printed material being read to maintain the leading edge of the shutter parallel to the lines of words on the page being read throughout the travel of the shutter over the entire page.

The foregoing and other important objects and desirable features inherent in and encompassed by the invention, together with many of the purposes and uses thereof, will become readily apparent from a reading of the ensuing description in conjunction with the annexed drawings, in which, FIGURE 1 is a perspective view of a manually operated, remedial reading device incorporating the invention; the device is illustrated in conjunction with a book;

FIGURE 2 is a side elevational view of the reading training device as seen substantially along line 2—2 of FIGURE 1;

FIGURE 3 is a vertical sectional view taken substantially along line 3—3 of FIGURE 2;

FIGURE 4 is a side elevational view of a modified form of reading training device; and FIGURE 5 is a vertical sectional view taken substantially along line 5—5 of FIGURE 4.

Referring to the drawings in detail, wherein like reference characters represent like elements throughout the various views, one adaptation and use of the invention is illustrated in FIGURE 1. The reading training device, designated generally by numeral 10, includes an elongated base member 11 which is substantially rectangularly shaped in vertical cross section. One longitudinally extending, vertical face 12 of the base member 11 is provided with a groove 13, the purpose of which will be apparent hereinafter. Rigidly secured to the normally upper surface 14 of the base member 11 by any suitable means is a pivot pin support 15. One face 16 of the pivot pin support 15, which is in the form of a cube-shaped block, is substantially in vertical alignment with the vertical face 17 of the base member 11 spaced and parallel to the face 12. The pivot pin support 15 is provided with a transversely extending threaded aperture therethrough which is adapted to threadingly receive the externally threaded, reduced diameter shank section 18 of a pivot pin 19. The pivot pin 19 includes a cylindrical section 20 extending between the threaded shank section 18 and an enlarged head 21. The juncture between the cylindrical section 20 and the threaded shank section 18 is in the form of an annular shoulder 22 which is adapted to bear tightly against the annular portion of the face 16 encircling the threaded aperture when the pivot pin 19 is assembled on the pivot pin support 15.

One end of a link 23 is pivotally supported by the cylindrical section 20. A concave, deformable spring washer 24 encircles the cylindrical section 20, and is interposed between the link 23 and the face 16 of the pivot pin support block 15. The washer 24 applies a yieldable axial force tending to urge the link 23 into abutting frictional engagement with the enlarged head 21 of the pivot pin 19. It is to be understood that the friction washer 24 applies a sufficient yieldable force to the link 23 to prevent any undue play between the pivot pin 19 and the link 23 but which is insufficient to prevent the link 23 from pivoting freely with respect to the pivot pin support block 15.

The reading training device 10 includes an elongated transversely extending shutter 25. The bar-like shutter 25 is provided with a pair of spaced and parallel straight edges 26 and 27. In use the flat bottom surface 28, as viewed in FIGURE 3, is adapted to lightly engage the sheet of page 29 of reading material being read. The normally outermost end of the shutter bar 25 is rigidly secured to a bracket by any suitable means. The bracket 30, like the pivot pin support block 15 is provided with a threaded aperture therethrough for receiving the end portion of a transversely extending threaded shank section 31 of a clamping screw 32. The clamping screw 32 has a cylindrical section 33 which is similar to the cylindrical section 20 but of a shorter axial length which is adapted to be disposed within an opening formed through the end of the link 23 opposite the end thereof connected to the pivot pin support block 15. A deformable, spring type washer 34 encircles the threaded shank portion 31 of the clamping screw 32 and is disposed between the link 23 and the bracket 30. From the foregoing it will be appreciated that by unthreading the clamping screw 32 from the bracket 30 sufficiently the shutter 25 may be rotated about a transversely extending axis corresponding to the longitudinal axis of the clamping screw 32 with respect to the link 23. Thereafter, by screwing the clamping screw 32 into the bracket 30, the spring washer 34 may be deformed sufficiently to cause the link 23 to be forced into frictional abutting engagement with the inner face 35 of an enlarged head 36 integrally formed on the outer end of the cylindrical section 33 of the clamping screw 32 and prevent relative rotational movement between the link 23 and the shutter 25. The enlarged head 36 has a knurled peripheral surface to facilitate threading and unthreading of the clamping screw 32 with respect to the bracket 30. From the foregoing it will be appreciated that the pivotal connection between the link 23 and the pivot pin support block 15 permits the shutter bar 26 to be moved vertically with respect to the uppermost surface 14 of the base member 11 and the clamping screw 32 cooperates with the link 23 spring washer 34 and bracket 30 and serves as a means for permitting angular adjustment of the shutter bar 25 with respect to the link 23 and as releasable lock means for maintaining the angular adjusted position of the shutter.

In use the reading material such as a book 37 is placed on the top surface of a desk, table, or other supporting structure and opened to the page it is desired to read in conjunction with the reading training device 10. The bottom surface 38 of the device 10 is also placed on the top surface of the supporting structure and one longitudinal edge of the book cover 39 is inserted into the longitudinally extending groove 13 until it bears upon the vertical surface 39 defining the bottom of the groove 13. It is to be understood that the height of the groove 13, as viewed in FIGURE 3, is slightly greater than the usual thickness of a book cover and therefore the base member 11 may freely slide with respect to the edge of the book cover 39. With the device 10 properly in place on the book 37 the uppermost page of the book is adapted to rest upon the uppermost surface 14 of the base member, as shown in FIGURE 3. It will also be noted that the book cover 39 extends substantially parallel to the surface of the supporting structure. This is due to the fact that the longitudinally extending bookbinding 41 generally supports the center portion of the cover 39 off of the supporting surface or table. The link 23 together with the shutter 25 is then pivoted with respect to the base member 11 to position the shutter above the top page or page 29 to be read. The clamping screw 32 is then loosened sufficiently to permit pivoting of the shutter bar 25 with respect to the link 23 and the link 23 is then pivoted with respect to the base member 11 so as to cause the bottom surface 28 of the shutter bar 25 to lightly rest upon the top of the page 29 to be read. The clamping screw 32 is then tightened to lock the shutter 25 in its angularly adjusted position. Inasmuch as the lines of printed words on the page 29 are generally perpendicular to the longitudinal edge of the page which in turn is parallel to the longittudinal edge of the book cover 39 received within the groove 13 of the base member 11 the leading edge 26, as the shutter bar 25 is moved downwardly across the page 29, is parallel to the lines of printed words on the page. The base member 11 is then moved with respect to the book 37 until the leading edge 26 is just above the top line of printed words on the page 29. The student then commences to read the page and as he does so he grasps the base member 11 and moves the shutter 25 downwardly over the page 29 masking each line of printed words upon completion of reading the same. In this manner the student becomes familiar with the remedial reading technique of preventing the reader from rereading fragments of previously read sentences or lines of printed material and thus the transition to a power actuated, speed controlled automatic remedial reading device wherein the shutter bar 25 moves over the printed page at a present rate of speed is less repugnant. It will also be appreciated that by pivoting the link 23 with respect to the base member 11 the shutter bar 25 is adjustable vertically with respect to the surface upon which the base plate 11 and book 37 are supported to compensate for different thicknesses of reading material and the shutter 25 is angularly adjustable to permit the bottom surface 28 of the shutter bar 25 to lie flat upon the page 29 regardless of the vertical distance between the page 29 being read and the supporting surface. Thus the device can be used with books, magazines or any other readily available material having a relatively wide range of thicknesses. It will also be appreciated that in lieu of an edge of a book being received in the groove 13 the longitudinal edges of a magazine, loose sheets of paper, or other reading material may be used as a guide for the base member 11.

The second embodiment of the invention shown in FIGURES 4 and 5, includes an elongated base member 42 which has one transverse face 43 provided with a groove 44 adapted to slidably receive a longitudinal edge of a book cover or other reading material so as to be guided thereby as it is manually propelled relatively to the reading material. A pair of links 45, 46 each have one end pivotally connected to the base member 42 and their opposite ends pivotally connected to a shutter support element 47. The pivotal connection means of the links 45 and 46 to the base member 42 and to the shutter support element 47, each includes a pivot pin 48 and a deformable friction washer 49 which are similar to the pivot pin 19 and the friction washer 16, respectively, utilized to connect the link 23 to the pivot pin support block 15 in the first modification of the invention described above. It will be noted that the links 45 and 46 are of the same length and the pivot pins 48 for pivotally connecting the links 45, 46 to the base member are spaced from each other and in horizontal alignment. The pivot pins 48 for pivotally connecting the links 45, 46 to the shutter support element 47 are also spaced and in horizontal alignment and since the spacing between each pair of horizontally aligned pivot pins 48 is the same a parallelogram linkage system is provided. Consequently the top horizontal surface 49 of the shutter support element 47 always remains parallel to the top surface 50 of the base member 42 regardless of the vertical position of the shutter support element 47 with respect to the base member 42. This is evident by noting the parallel relationship of the surfaces 49 and 50 in the broken line position of the shutter support elements 47 in FIGURE 4. The uppermost surface 50 of the shutter support element 47 is undercut to provide a horizontal surface 52 vertically spaced below the surface 50 and a shoulder 53. The surface 52 and the shoulder 53 define a pocket for receiving one end of an elongated shutter 54. Fastening means such as a flat headed machine screw 55 is adapted to extend through the shutter 54 and into threading engagement with a threaded recess formed through the shutter support element 47 and opening into the surface 52. It will be appreciated that in both embodiments of the invention the shutter bars may be readily replaced with shutters of lengths other than the lengths illustrated to accommodate reading material such as books, sheets of paper, etc. having widths different from that illustrated in the drawings.

In use, the book or other reading material is laid flat upon the desk, table, or other supporting structure and the longitudinal edge of the book cover or the edges of the pages of the pamphlet or other reading material to be read are inserted within the groove 44 and caused to engage that portion 56 defining the bottom groove 44. The shutter bar support element 47 is then lowered until the lowermost surface of the shutter bar 54 engages the surface of the page to be read. Thereafter the base member 42 is moved until the edge of the shutter 54 acting as the leading edge as it is moved downwardly over the page is above the first line of printed words on the page. As in the case of the first embodiment of the invention the student begins to read the page and as he does so he moves the shutter 54 downwardly on the page by grasping the base member 42. A reading training device constructed in accordance with accordance with either of the embodiments of the invention described above is capable of being used in conjunction with printed reading matter of various sizes and thicknesses and the shutter is angularly adjustable in the case of the first described embodiment and automatically adjustable in the case of the second embodiment of the invention whereby the lowermost surface of the shutter always lies flat on the page of the reading material being read. In both forms of the invention the shutter is guided as it moves over the page of the reading material being read by the reading material itself so the leading edge thereof is maintained parallel to the lines of printed words on the page being read. Furthermore the reading training device is extremely simple in construction and therefore inexpensive to produce and may be readily transported or carried by the student to enable him to practice remedial reading at home or in study halls or the like.

The embodiments of the invention chosen for the purposes of illustration and description herein are those preferred for achieving the objects of the invention and developing the utility thereof in the most desirable manner, due regard being had to existing factors of economy, simplicity of design and construction, production methods and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. A remedial reading training device for use in conjunction with the reading of a page of reading material, said reading material having longitudinally extending means, comprising, an elongated shutter extending transversely across the page to be read; a base member having a groove formed in a face thereof, said groove being adapted to slightly receive said longitudinally extending edge means whereby said base member is guided for longitudinal sliding movement with respect to said reading material; and means operatively connecting said base member and said shutter whereby longitudinal sliding movement of said base member effects movement of said shutter in a direction perpendicular to the longitudinal axis thereof.

2. A remedial reading training device substantially as set forth in claim 1, wherein said means operatively connecting said base member and said shutter includes link means, means for pivotally connecting one end of said link means to said base member; and means oeratively connecting the opposite end of said link means to said shutter.

3. A remedial reading training device substantially as set forth in claim 1, wherein said means operatively connecting said base member and said shutter includes link means including a link; means pivotally connecting one end of said link to said base member for relative pivotal movement about a transversely extending axis; and means operatively connecting the opposite end of said link to said shutter.

4. A remedial reading training device for use in conjunction with the reading of a page of reading material, said reading material having longitudinally extending edge means, comprising, an elongated shutter extending transversely across the page to be read; a slidable base member; means carried by said base member and cooperable with said longitudinally extending edge means for guiding said base member for longitudinal sliding movement with respect to said reading material; and a parallelogram linkage system operatively interconnecting said shutter and said base member whereby said shutter is movable toward and away from said base member and whereby longitudinal sliding movement of said base member effects simultaneous movement of said shutter in a direction perpendicular to the longitudinal axis thereof.

5. A remedial reading training device for use in conjunction with the reading of a page of reading material, said reading material having longitudinally extending edge means, comprising, an elongated shutter extending transversely across the page to be read; a block-like shutter support element secured to one end of said shutter, said support element having a flat surface; a slidable base member having a flat surface substantially parallel to said flat surface of said support element; means carried by said base member and cooperable with said longitudinally extending edge means for guiding said base member for longitudinal sliding movement with respect to said reading material; and a pair of links having substantially the same length, each of said links having one end pivotally connected to said support element and its opposite end pivotally connected to said base member, a line extending between the pivotal connections of said links to said base member being parallel to and of the same length as a line extending between the pivotal connections of said links to said support element whereby said base member and support element are movable relatively to each other to vary the spacing between said flat surfaces thereof and longitudinal sliding movement of said base member effects simultaneous movement of said shutter in a direction perpendicular to the longitudinal axis thereof.

6. A remedial reading training device substantially as set forth in claim 5, wherein said means carried by said base member and cooperable with said longitudinally extending edge means includes a groove formed in a face of said base member adapted to slidingly receive said longitudinally extending edge means.

7. A remedial reading training device for use in conjunction with the reading of a page of reading material, said reading material being supported on a flat supporting surface and having longitudinally extending edge means parallel to said flat supporting surface, comprising an elongated shutter extending transversely across the page to be read, said shutter having a flat surface; a slidable base member having a flat surface slidably engaging said flat supporting surface; means carried by said base member and cooperable with said longitudinally extending edge means for guiding said base member on said flat supporting surface for longitudinally sliding movement with respect to said reading material; a link; means pivotally connecting one end of said link to said base member for relative pivotal movement about a transversely extending axis; and means for connecting one end of said shutter to the opposite end of said link for relative pivotal movement about a transversely extending axis whereby said flat surface of said shutter is adjustable to various angular positions with respect to said flat supporting surface, said last mentioned means including means for releasably locking said shutter in any of said angular positions, said shutter being movable in a direction perpendicular to the longitudinal axis thereof upon longitudinal sliding movement of said base member.

8. A remedial reading training device substantially as set forth in claim 7, wherein said means carried by said base member and cooperable with said longitudinally extending edge means includes a longitudinally extending groove formed in a face normal to said flat face of said base member adapted to slidingly receive said longitudinally extending edge means.

References Cited in the file of this patent

UNITED STATES PATENTS

| | | |
|---|---|---|
| 2,765,543 | Crowell et al. | Oct. 9, 1956 |
| 2,925,670 | French | Feb. 23, 1960 |